United States Patent
Vanhoudt et al.

(10) Patent No.: US 10,883,728 B2
(45) Date of Patent: Jan. 5, 2021

(54) BROAD BAND DISTRICT HEATING AND COOLING SYSTEM

(71) Applicant: VITO, Mol (BE)

(72) Inventors: Dirk Vanhoudt, Arendonk (BE); Johan Van Bael, Westerlo (BE)

(73) Assignee: VITO, Mol (BE)

( * ) Notice: Subject to any disclaimer, the term of this patent is extended or adjusted under 35 U.S.C. 154(b) by 35 days.

(21) Appl. No.: 15/303,995

(22) PCT Filed: Mar. 26, 2015

(86) PCT No.: PCT/EP2015/056669
§ 371 (c)(1),
(2) Date: Oct. 13, 2016

(87) PCT Pub. No.: WO2015/161987
PCT Pub. Date: Oct. 29, 2015

(65) Prior Publication Data
US 2017/0030590 A1    Feb. 2, 2017

(30) Foreign Application Priority Data

Apr. 22, 2014  (EP) .................................... 14165352

(51) Int. Cl.
*F24D 10/00*  (2006.01)
*F24D 11/00*  (2006.01)
(Continued)

(52) U.S. Cl.
CPC ........... *F24D 10/003* (2013.01); *F24D 10/00* (2013.01); *F24D 11/001* (2013.01);
(Continued)

(58) Field of Classification Search
CPC ...... F24D 10/00; F24D 10/003; F24D 11/001; F24D 10/006; F24D 11/0207; F24F 3/08; F24F 3/10; Y02B 10/20; Y02E 20/14
See application file for complete search history.

(56) References Cited

U.S. PATENT DOCUMENTS

| | | | |
|---|---|---|---|
| 2010/0018668 A1* | 1/2010 | Favrat | F24D 10/003 165/48.1 |
| 2012/0279681 A1* | 11/2012 | Vaughan | F24D 10/003 165/62 |

(Continued)

FOREIGN PATENT DOCUMENTS

| | | |
|---|---|---|
| AT | 376788 B  12/1984 | |
| CH | 692216 A5 * 3/2002 | ............. F24D 10/00 |

(Continued)

OTHER PUBLICATIONS

Machine Translation of CH692216; Retrieved Mar. 8, 2017.*
(Continued)

*Primary Examiner* — Eric S Ruppert
*Assistant Examiner* — Hans R Weiland
(74) *Attorney, Agent, or Firm* — Bacon & Thomas, PLLC

(57) ABSTRACT

A method and system that allows thermal energy to be supplied at different temperature levels to consumers, where each consumer is provided with its desired temperature whenever that is necessary. The method or a system for supplying consumers with heat energy or with cooling energy includes a set of three or more conduits for carrying a heat transfer fluid, each conduit carrying fluid at one of three or more different temperatures or temperature ranges, a plurality of heating and/or cooling consumer appliances distributed along the length of the conduits, each consumer appliance being linked to one of a plurality of pairs of conduits such that either: a consumer appliance is linked on a high temperature side, or a consumer appliance is linked (Continued)

on a low temperature side; a number of heat or cold generators, each pair of conduits being connected to at least one of the generators.

14 Claims, 1 Drawing Sheet

(51) Int. Cl.
F24D 17/00 (2006.01)
F24F 3/08 (2006.01)
F24F 3/10 (2006.01)

(52) U.S. Cl.
CPC ............ *F24D 17/0078* (2013.01); *F24F 3/08* (2013.01); *F24F 3/10* (2013.01); *Y02B 10/20* (2013.01); *Y02B 30/17* (2018.05); *Y02E 20/14* (2013.01)

(56) References Cited

U.S. PATENT DOCUMENTS

| | | | |
|---|---|---|---|
| 2013/0299126 A1* | 11/2013 | Kim | F24D 11/001 165/47 |
| 2015/0345803 A1* | 12/2015 | Nakao | F24F 3/06 165/218 |

FOREIGN PATENT DOCUMENTS

| | | | | |
|---|---|---|---|---|
| CN | 102865203 A | | 1/2013 | |
| CN | 203081664 U | | 7/2013 | |
| CN | 203081665 U | | 7/2013 | |
| CN | 103307655 A | | 9/2013 | |
| DE | 195644 C | | 1/1908 | |
| EP | 0647818 A1 | | 4/1995 | |
| GB | 654218 | | 6/1951 | |
| GB | 654218 A | * | 6/1951 | ............... F24D 3/04 |
| GB | 1588125 A | | 4/1981 | |
| WO | WO 9520135 A1 | * | 7/1995 | ........... F24D 10/003 |

OTHER PUBLICATIONS

"Sustainable Thermal Storage Systems", Lucas B Hyman, McGraw Hill 2011, ISBN 978-0-07-175297-8.
International Search Report (ISR) dated Jun. 18, 2015, for PCT/EP2015/056669.
Written Opinion dated dated Jun. 18, 2015, for PCT/EP2015/056669.
European Search Report dated Sep. 3, 2014, for EP 14165352.7.
Chinese Office Action in related Chinese Application No. 201580020951.8, dated Oct. 9, 2018.
European Examination Report in related European Application No. 15715193.7-1008, dated Jan. 28, 2020.

* cited by examiner

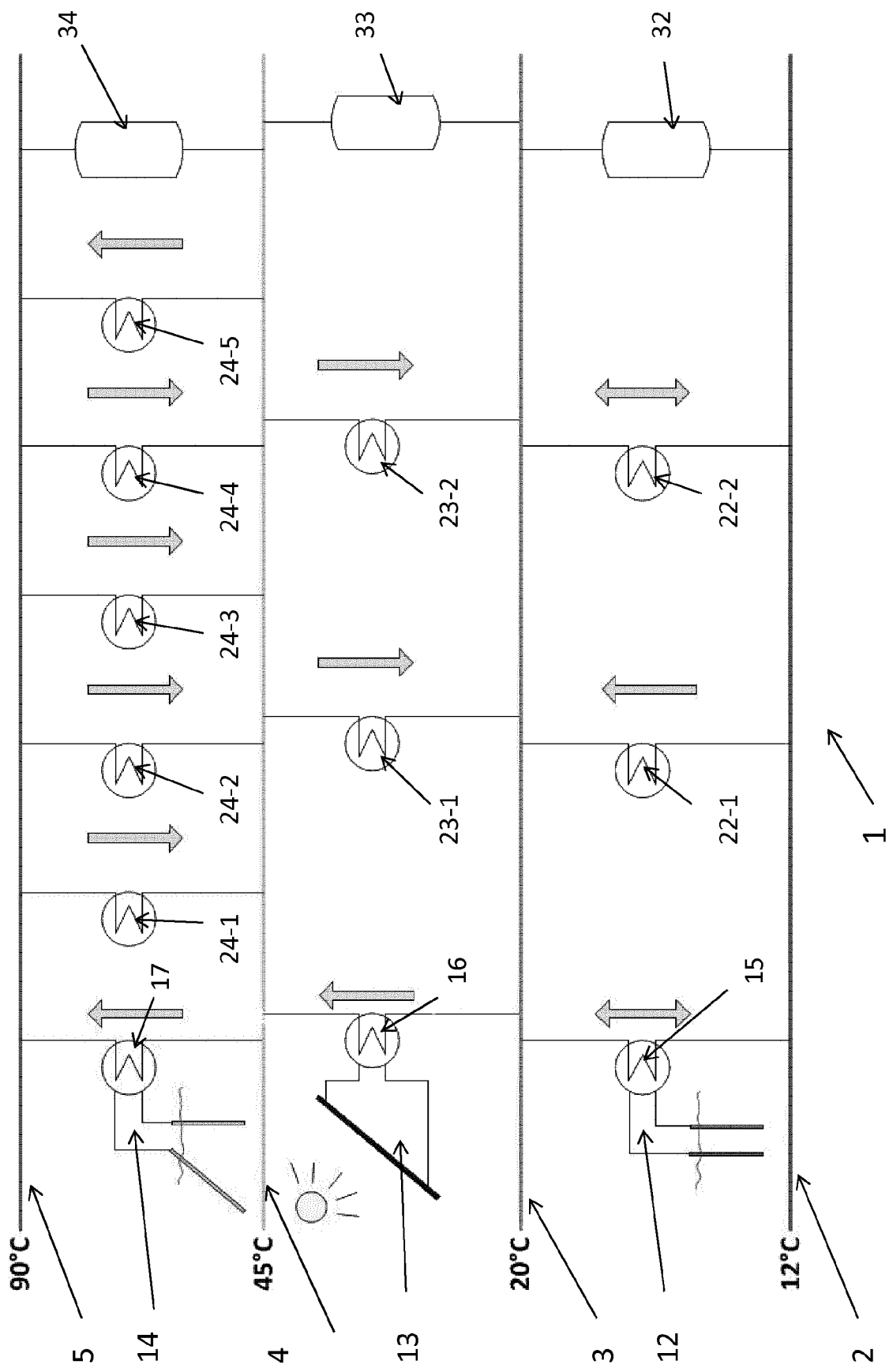

BROAD BAND DISTRICT HEATING AND COOLING SYSTEM

The present invention relates to a system and to a method for supplying consumers with heat energy and/or with cooling energy by means of a transfer medium, having a plurality of sources for heat energy and/or for cooling energy. The output lines of the sources are input to a district heating and cooling system at different temperature levels.

BACKGROUND

Conventionally district heating systems have an outgoing and incoming conduit and consumers of heat energy or of cooling energy take heating or cooling fluid from the supply lines and return it back to the source via the return lines. Usually, the consumers of heat/cold are connected in a parallel configuration between the supply and return lines. When heat/cold is needed by a consumer, a valve is opened whereby the transfer fluid is taken from the supply line and injected into the return line. However, series connection of consumers can also be possible if heat/cold is needed at different temperature levels. Optionally, heat or cold energy which is not required by any of the consumers could be stored in a thermal energy storage.

SUMMARY OF THE INVENTION

It is an object of the invention to provide an alternative system and a method for supplying heat energy and/or cooling energy to consumers. Embodiments of the present invention provide a method and system that allows thermal energy to be supplied at different temperature levels to consumers (broad band district heating and cooling), whereby each consumer is provided with its desired temperature whenever that is necessary.

In accordance with embodiments of the present invention, a method or a system for supplying consumers with heat energy or with cooling energy is provided, comprising: a set of three or more conduits for carrying a heat transfer fluid, each conduit carrying fluid at one of three or more different temperatures or temperature ranges, a plurality of heating and/or cooling consumer appliances distributed along the length of the conduits, each consumer appliance being linked to one of a plurality of pairs of conduits such that either:

a consumer appliance is linked on a high temperature side to one of the conduits of a pair for receipt of fluid and for extraction of heat energy and being linked to another of the conduits of the pair at a lower temperature side to discharge the fluid into the another of the conduits, or a consumer appliance is linked on a low temperature side to one of the conduits of a pair for receipt of fluid for cooling and being linked to another of the conduits of the pair at a higher temperature side to discharge the fluid into the another of the conduits;

a number of heat or cold generators, each pair of conduits being connected to at least one of the generators to either:

raise the temperature of the fluid from the lower temperature conduit of the pair to the temperature of the higher temperature conduit of the pair, or lower the temperature of the fluid of the higher temperature conduit of the pair to the lower temperature of the lower temperature conduit of the pair.

Optionally, a consumer appliance and a generator can be one physical device, whereby during a certain time period the device acts as a consumer appliance while during another time period the device acts as a generator of heat and/or cold. Each pair of conduits can be terminated by a thermal energy storage and/or be connected to a thermal energy storage at any intermediate position along the conduits. Alternatively any or all of the conduits can be in a loop. All the conduits may be at the same pressure or there may be small pressure differences between them that are not sufficient to circulate the fluid through the system continuously. Thermal energy storage and/or energy generators may be located at any position along the conduits especially to maintain the temperature of the transfer fluid at its prescribed temperature or within its prescribed temperature range or to maintain the hydraulic balance between the different conduits. Consumer appliances for energy at a first temperature or temperature range are ganged in parallel, whereas consumer appliances for energy at second temperature or temperature range can be in some circumstances in series with consumer appliances for energy at the first temperature or temperature range. Each or every conduit can allow bidirectional flow. The controllers, and/or valves and/or pumps which are used in embodiments of the systems according to the present invention are preferably arranged and configured to allow each or every conduit to support bidirectional flow. In embodiments of the present invention there is no need for dedicated return lines, each conduit can and does act as an incoming or outgoing line, as a supply or return conduit. The distributed systems and methods of the present invention may be described as closed systems and methods.

In conventional systems two conduits (supply and return) are required for each temperature. So for three temperature levels, six are required. Embodiments of the present invention require only three. For four temperatures conventional systems would require eight conduits whereas the present invention would only require four. Hence the present invention is efficient in the use of materials and in reduction of installation cost.

In conventional systems, a pressure difference is maintained between the supply and return lines by means of one or more circulation pumps. Heat/cold is extracted from the supply lines by opening a valve and removing thermal energy transfer fluid. The pressure difference between the supply and return pipes provokes a flow rate between the supply and return line. In embodiments of the present invention, it is possible to have no pressure difference between the conduits or such a little difference that is insufficient to maintain continuous circulating flow though supply and return pipes. Each consumer or generator of heat/cold preferably has its dedicated circulation pump. When energy is used or produced by the consumer or generator, the specific circulation pump is activated. Embodiments of the present invention allow pressure differences between the conduits under certain circumstances but all devices connected to the conduits must be rated for the pressures used.

The present invention in another aspect provides a heat or cold distribution and generation controller for operating the systems or methods of any of the embodiments of the present invention. This controller may receive inputs from temperature and/or flow controllers and may have outputs to control any of the heat energy or cooling energy sources and pumps and valves.

Thermal energy storages may be connected in parallel with a plurality of the consumer devices between two of the conduits. Each thermal energy storage device which is connected to two conduits will store heat or cooling energy at the temperature appropriate for the conduits to which it is attached, i.e. the thermal energy storages will be at different temperature levels. The thermal energy storages are provided and configured to store excess heat or cooling energy at a given temperature level and to supply heat or cooling energy content contained therein to the consumer at the given temperature level. Moreover, the thermal energy storages can assist in maintaining the hydraulic balance between the conduits in the system, e.g. to operate as buffers. Thermal energy storages can be any of sensible thermal storage systems, hot water thermal storage schemes, chilled water systems, underground thermal energy storage, latent thermal storage systems which rely on a phase change such as external melt ice on coil systems, internal melt ice on coil systems, encapsulated ice systems, ice harvesters, ice-slurry systems, ice glycol systems, phase change material systems, thermochemical storage device, sorption storage device etc or combinations of different storage systems. According to a method and system according to embodiments of the present invention, the thermal energy which is output by a source for heat energy or for cooling energy and which is not required by the consumers is output to at least one of the thermal storage systems connected in parallel with the consumers of a certain temperature level or temperature range and is stored in said storage systems. As the need arises thermal energy is removed from the storage system and supplied to consumers. Optionally excess heat can be simply lost to the atmosphere however this is not preferred as it is wasteful.

Although not described in detail the skilled person will appreciate that suitable controllable valves and pumps may be used to connect or disconnect any part of the system.

Other features of the present are set forth in the appended claims each of which defines an embodiment of the present invention.

DEFINITIONS

Supplying "heat energy" and supplying "cooling energy" is to be understood as providing or removing thermal energy respectively.

"Thermal energy storage devices" may not only include devices to store heat or cold energy but may also include pressure buffers to help stabilise pressures in the system.

"District heating" (less commonly called teleheating) is any system for distributing heat and or cold for any purpose such as for residential and/or commercial and industrial heating and/or cooling requirements.

"Generators" i.e. sources for heating or cooling energy may include boilers, heat pumps, deep and shallow geothermal plants, solar panels or collectors (i.e. solar heating of a fluid such as water, so-called solar water heating systems), combined heat and power (CHP) systems, combined cooling heat and power (CCHP), chillers, compression cooling machines, ad-/absorption cooling machines or heat pumps, (organic) rankine cycles (ORC), dry or wet cooling towers, systems using at least one environmental collector and a heat pump, waste heat or cold systems, etc. Heat can be obtained, for example from a cogeneration plant burning fossil fuels or biomass, heat-only boiler stations, geothermal heating, heat pumps and central solar heating can be used, as well as nuclear power. In accordance with embodiments of the present invention thermal sources can and should be selected so that they operate efficiently at the temperature at which they are to deliver. Thus embodiments of the present invention have the advantage of making use of heat sources that are available—more than are typically used in conventional systems.

BRIEF DESCRIPTION OF THE DRAWINGS

The FIGURE is a schematic illustration of a system according to an embodiment of the present invention. Each consumer appliance or generator has a circulation pump assigned to it and controllable valves can be provided. These are not shown. In the FIGURE the arrows indicate the direction of the transfer fluid flow through the heat exchangers.

DETAILED DESCRIPTION OF THE INVENTION

The present invention will be illustrated and described with respect to certain embodiments, e.g. a system and method for supplying consumers with heat energy or with cooling energy. The present invention is not necessarily limited to the details shown, since the skilled person is aware that various modifications and structural changes may be made therein without departing from the spirit of the invention and within the scope and range of equivalents of the claims.

The present invention is compatible with the use of renewable energy sources and in particular with the use of sustainable heating and cooling systems. It is also an aim of embodiments of the present invention to provide sustainable heat or cold economically for individual users. For example, embodiments of the present invention can be used with deep or shallow geothermal heat and cold systems as well as waste heat from industrial processes. Energy can also be obtained from integrated renewable electricity systems and in particular to accept energy from renewable sources such as solar or wind power when their unpredictable nature causes an excess of energy. In this way the present invention may assist in balancing loads on these electrical networks. Heat networks can contribute to support the electrical networks. Conversely the present invention can allow the use of geothermal CHP systems where there is a scarcity of renewable energy. Embodiments of the present invention can be flexible in their use of energy sources.

Embodiments of the present invention create flexibility in a heating network by integrating thermal storage into the heat and cold distribution network.

Accordingly, embodiments of the present invention have at least one or a combination of the following advantages:
- a limited number of conduits is needed, for example only three, four, five or six lines which is less that would be required by a classic heating and cooling network if the same number of temperatures were to be supplied,
- fairly simple to build as the number of lines is low,
- makes flexible use of available heat sources; and
- operates these at optimum conditions.
- advantageous use of thermal storage tanks, especially stratified tanks.
- scalable and avoiding bottlenecks such as created by centralized distributors.
- use of several thermal energy sources such as heat pumps, gas or oil boilers, solar collector, CHP, waste heat source etc.
- providing a thermal grid including both heating and cooling at different temperatures but does not require for every temperature level a separate supply and return pipe.

With reference to the FIGURE a system 1 according to an embodiment of the present invention comprises a plurality of lines, pipes or conduits 2, 3, 4, 5 for transferring a thermal energy transfer fluid such as water. Although four conduits are shown, other numbers are suitable such as at least three conduits, or alternatively five or six or more conduits. As space must be provided for each conduit and there are costs of materials and for the installation, the number of conduits is likely to be limited by the economics of the systems. Also the present invention does not exclude that the conduits can be branched, and those branches further branched, etc. This is possible as systems and methods of the present invention are not or are not necessarily circulating from supply lines to return lines. As systems and methods of the present invention rely on equalising flows back and forwards within the system, branched systems work equally well. Therefore, the controllers, and/or valves and/or pumps which are used in embodiments of the systems according to the present invention are preferably arranged and configured to allow each or every conduit to support bidirectional flow. Also the FIGURE shows linear conduits, but these could be joined into loops, e.g. into loops and branches.

Devices 12, 13, 14 for outputting heat energy or cooling energy are provided. These are shown all at the left of the FIGURE but this is only schematic. These devices can each be placed at any suitable place in the system. For example a heat pump that uses excess electrical energy from a wind turbine farm may located close thereto, whereas a geothermal plant may be located at a place where the underground geology is most suitable. In fact as there is no need for a specific directional flow, the conduit system can be seen as comprising reservoirs or collectors of thermal energy at various temperatures, i.e. that the system is a distributed thermal storage system with thermal energy sources and sinks with flows arranged to maintain temperatures in each conduit within specified ranges and to maintain hydraulic balance in the system. Also additional thermal storage systems may be connected into the system. For example ground mass thermal storage systems, below ground stratified warm water or chilled water thermal storage systems, above ground warm water or chilled water thermal system and many other thermal storage systems as described in "Sustainable Thermal Storage Systems", Lucas B Hyman, McGraw Hill 2011, ISBN 978-0-07-175297-8. Controllable pumps are preferably installed at every consumer or generator to move volumes of thermal transfer fluid such as water in order to supply or extract heat or cold to or from the conduits. When necessary, additional pumps can be included.

The number of heat or cold generators 12-14, are coupled to a pair of conduits so that each generator 12-14 is coupled to at least one pair of conduits. A generator 12-14 can:

raise the temperature of the fluid from a lower temperature conduit of the pair to the temperature of the higher temperature conduit of the pair, or can lower the temperature of the fluid of the higher temperature conduit of the pair to the lower temperature of the lower temperature conduit of the pair. The generators 12-14 are coupled to the conduits by heat exchangers 15, 16, 17, respectively for example.

The generators 12-14 may be able to switch from heating to cooling as shown schematically for generator 12.

As examples of thermal generators the FIGURE shows schematically a below ground aquifer thermal energy storage system (ATES) 12, a solar water heater 13 and a geothermal plant 14. The FIGURE shows a selection of possible thermal sources. An advantage of the present invention is that the number of temperature levels that can be used and hence the number of different thermal energy sources that can be used is increased without increasing the number of conduits as in a conventional system. This allows a variety of thermal energy sources to be used and to use them in optimum operation ranges as intermediate temperatures can be utilised. Therefore this invention is also perfectly suited to integrate distributed, small-scale renewable energy sources like solar thermal panels or residential heat pump systems, which is an advantage as these systems are expected to become important in future generations of thermal grids. This also means that environmentally friendly and sustainable thermal energy sources can be utilised especially as the highest temperatures are not used exclusively.

Heat energy or cooling energy at different temperature levels is output by the devices 12 to 14, for example by transferring thermal energy in a heat exchanger 15, 16, 17 respectively to a suitable heat transfer fluid. In this case, heat energies are at nominal temperatures of 12° C., 20° C., 45° C. and 90° C. respectively, however, dependent on the connected consumers and generators, other values could be chosen as well. These may e.g. also be expressed as ranges, e.g. 12±5° C., 20±5°, 45±5°, 90±5°; or 12±5°, 20±5°, 45±10°, 90±10°, or 12±5°, 20±5°, 45±10°, 90±15° C.

A plurality of consumer thermal energy absorbers 22-1 and 22-2, 23-1 and 23-2, and 24-1 to 5 are provided which require different temperature levels. Each consumer appliance is connected between two conduits—one at a higher temperature, the other at a lower temperature. For heating, transfer fluid is taken from the hotter conduit and heat energy extracted before delivering the colder fluid to a conduit at a lower temperature—see 23-1 and 23-2, 24-1 to 24-4. For cooling, transfer fluid is taken from the colder conduit and cooling energy extracted (heat energy absorbed) before delivering the warmer fluid to a conduit at a higher temperature—see 22-1 and 24-5. Heat exchangers 23-1 and 23-2, and 24-1 to 24-5 are used to consume the heat energy at the consumer premises. Exchanger 22-2 can switch between cooling and heating. The appliances at consumers' premises can be industrial heating processes, space heating like underfloor heating or radiators, hot water production, refrigeration/cooling, air conditioning systems, industrial cooling processes etc. For each appliance the conduits are selected which provide the best operation. The present invention includes that in any embodiment devices may be coupled between two conduits and may be devices which can optionally sometimes act as a consumer of heat/cold and at other times can be switched to being a generator of heat/cold as shown schematically for exchanger 22-2.

Consumers' appliances as well as sources of heat or cold can be switched between two of the plurality of conduits depending on their temperature level. For example, a main building can draw water of 90° C., cool it during the heating of the building, down to 45° C. and inject it into the conduit at 45° C. For example a heat exchanger is used to generate warm water at 60° C. from water at 90° C. This water at 60° C. is used in conventional radiators to heat rooms in a building. The temperature 45° C. is sufficient to heat a building by other means, e.g. by underfloor heating. The resulting cooled water is then injected at 20° C. into the conduit at 20° C. The 20° C. water can be used in winter to preheat the air of rooms or spaces in buildings to prevent icing or in summer for cooling in an air conditioning system. The conduit at 12° C. can be used for cooling.

On the other hand, there are sources of heat or cold provided that can for example heat water from 45° to 90° C., 20° C. to 45°, 12 to 20° C. or for example cool water from 90° C. to 45° C., 45° C. to 20° C., 20° C. to 12° C. For emergency back-up the thermal energy generators 12 to 14 may be provided with conventional heating or cooling means in parallel, e.g. heating furnaces or compression chillers. Although consumer appliances are shown as being located between two conduits with close temperatures, consumer appliances can be connected between any two of the plurality of conduits, e.g. 3, 4, 5 or 6 or more conduits.

In order to store thermal energy that can be used later, thermal energy storage devices 32, 33 and 34 are connected to the conduits 12 and 13, 13 and 14 and 14 and 15 respectively. More such thermal storage devices connected in this way may be placed at any position in the network where it is necessary to store thermal energy and provide it again at a later time or where it is necessary to maintain the hydraulic balance in the system. Therefore, the thermal energy storage device could also consist of a hydraulic balance bottle.

Various devices may be included in the district system according to embodiments of the present invention to provide additional facilities and or to provide stable operation. In parallel to the thermal energy storage devices, heat to electricity converters such as Rankine cycle engines can be provided to remove excess heat when required to keep the system stable. In particular organic Rankine cycle (ORC) systems can utilise any waste heat produced from the district heating system to provide additional electrical power. Alternatively, waste heat from the cooling system of an ORC could be used as a source of heat in the system. Also ad- or absorption chillers can be installed between conduits.

Absorption chillers operate using heat instead of mechanical energy to give out cooling. An absorption chiller has an absorber, a generator, a pump, and a throttling device. An absorption chiller works when refrigerant vapour from the evaporator is absorbed by a solution mixture in the absorber. This solution is then pumped to the generator. The refrigerant then re-vaporizes using heat extracted from one of the conduits and the refrigerant-depleted solution then goes back to the absorber via a throttling device. The two most common refrigerant or absorbent mixtures that are used in operating absorption chillers are water/lithium bromide and ammonia/water. An absorption cooler could for example extract heat from the 90° C. conduit (whereby the cooled down water is returned to the 45° C. conduit) and cool down water from the 20° C. conduit to the 12° C. conduit.

The present invention in another aspect provides a heat distribution and generation controller, such as a supervisory control and data acquisition system (SCADA). for operating the systems or methods of any of the embodiments of the present invention. This controller may receive inputs from temperature and/or flow controllers and may have outputs to control any of the heat energy or cooling energy sources or consumer appliances. For example, flow sensors can be provided to measure the flow to or from the thermal energy sources 12-14 as well as through the heat exchangers 22-1 and 22-2, 23-1 and 23-2, and 24-1 and flows to and from the thermal energy storage devices 32, 33 and 34. Also temperature sensors can be placed distributed through the network. The complete system can be simulated from which it can be determined when flow should be to or from the storage devices 32, 33 and 34, and when flow from the thermal energy sources 12-14 is required. Such network control rooms are well-known. The skilled person will appreciate that controllable pumps and valves are provided in as required. The controllers, and/or valves and/or pumps which are used in embodiments of the systems according to the present invention are preferably arranged and configured to allow each or every conduit to support bidirectional flow.

It will be understood that the invention is not limited in any way by the exemplifying embodiments described above, but may be varied and modified in a number of ways without departing from the spirit of the invention and scope of the appended claims.

The invention claimed is:

1. A district heating and/or cooling system comprising:
   a set of three or more main supply conduits for carrying a thermal energy transfer fluid, each conduit carrying the fluid at a different temperature,
   a plurality of consumer appliances distributed along the length of the main supply conduits, each consumer appliance connected to a higher temperature side of a first one of at least two conduits having thermal transfer fluid at different temperatures and connected to a lower temperature side of a second one of the at least two conduits having thermal transfer fluid at different temperatures and being separate from the first one, wherein said consumer appliance is connected to the at least two conduits by branch conduits,
   at least one of the plurality of consumer appliances being adapted for either:
   receipt of the fluid from the first one of the conduits and for extraction of heat energy and to discharge the fluid into the second one, or
   receipt of the fluid from the second one of the conduits for cooling and to discharge the fluid into the first one,
   further comprising:
   a plurality of heat generating and/or cooling plants, each of the at least two conduits being connected to at least one of the plants to either:
   raise the temperature of the fluid in the lower temperature conduit of the at least two conduits to the temperature of the fluid in the higher temperature conduit of the at least two conduits, or
   lower the temperature of the fluid in the higher temperature conduit of the at least two conduits to the lower temperature conduit of the at least two conduits,
   wherein the district heating and/or cooling system is adapted so that the flow of fluid in any of the main supply conduits is bi-directional in a forward flow and a reverse flow in each of said main supply conduits so that each of the main supply conduits is configured as a supply and return conduit to maintain each of the main supply conduits at the different temperature,
   wherein the flow of fluid in any of the main supply conduits is without dedicated return conduits,
   wherein the district heating and/or cooling system is configured in a way such that each conduit of the set of three or more conduits is at the same pressure for carrying a thermal energy transfer fluid so as not to circulate the fluid through the district heating and/or cooling system continuously.

2. The district heating and/or cooling system of claim 1, wherein the plurality of heat generating and/or cooling plants are different ones selected from any of boilers, heat pumps, deep and shallow geothermal plants, solar panels or collectors, combined heat and power (CHP) systems, combined cooling heat and power (CCHP), chillers, compression cooling machines, ad-/absorption cooling machines or heat pumps, (organic) rankine cycles (ORC), dry or wet cooling towers, systems using at least one environmental collector and a heat pump, waste heat or cold systems, a cogeneration plant burning fossil fuels or biomass, heat-only boiler stations, as well as nuclear power.

3. The district heating and/or cooling system of claim 1, wherein the plurality of consumer appliances being connected fluidly in parallel.

4. The district heating and/or cooling system according to claim 1, wherein the conduits are connected in loops or have branches.

5. The district heating and/or cooling system according to claim 1, further comprising heat energy or cooling energy storage systems connected to pairs of conduits.

6. The district heating and/or cooling system of claim 5, wherein the energy storage systems are selected from any of: sensible thermal storage systems, hot water thermal storage schemes, chilled water systems, underground thermal energy storage, latent thermal storage systems which rely on a phase change such as external melt ice on coil systems, internal melt ice on coil systems, encapsulated ice systems, ice harvesters, ice-slurry systems, ice glycol systems, phase change material systems, thermochemical storage devices, sorption storage devices or combinations of different storage systems.

7. The district heating and/or cooling system according to claim 5, wherein the heat energy or cooling energy storage systems are connected to the set of three or more main supply conduits in a way such that a hydraulic balance in the district heating and/or cooling system is able to be maintained.

8. The district heating and/or cooling system according to claim 1, further comprising absorption chillers to extract heat from any one of the conduits or Rankine cycle engines to extract heat from any of the conduits and to provide electrical power or to inject waste heat from the Rankine cycle cooling system.

9. A method of operating a district heating and/or cooling system having a set of three or more main supply conduits for carrying a thermal energy transfer fluid, the method comprising:
providing each conduit with the fluid at a different temperature,
extracting heat energy from at least one of the conduits in a plurality of users devices distributed along the length of the main supply conduits, each user device being connected to a higher temperature side of a first one of at least two conduits having thermal transfer fluid at different temperatures for receipt of the fluid and for extraction of heat energy and connected to a lower temperature side of a second one of the at least two conduits to discharge the fluid into the second one having thermal transfer fluid at different temperatures and being separate from the first one, wherein said user device is connected to the at least two conduits by branch conduits,
raising the temperature of fluid from a lower temperature conduit of a pair of conduits and supplying the heated fluid to a higher temperature conduit of the pair,
wherein the flow of fluid in any of the main supply conduits is bi-directional in a forward flow and a reverse flow in each of said main supply conduits so that each of the conduits is configured as a supply and return conduit to maintain each of the main supply conduits at the different temperature,
wherein the flow of fluid in any of the main supply conduits is without dedicated return conduits,
operating the district heating and/or cooling system in a way such that each conduit of the set of three or more conduits is at the same pressure for carrying a thermal energy transfer fluid so as not to circulate the fluid through the district heating and/or cooling system continuously.

10. The method of claim 9, wherein the raising step is performed by a plurality of heat generating plants selected from any of boilers, heat pumps, deep and shallow geothermal plants, solar panels or collectors, combined heat and power (CHP) systems, combined cooling heat and power (CCHP), chillers, compression cooling machines, ad-/absorption cooling machines or heat pumps, (organic) rankine cycles (ORC), dry or wet cooling towers, systems using at least one environmental collector and a heat pump, waste heat or cold systems, a cogeneration plant burning fossil fuels or biomass, heat-only boiler stations, as well as nuclear power.

11. The method according to claim 9, further comprising storing thermal energy in a thermal storage device connected between pairs of conduits.

12. The method according to claim 11, wherein the energy storage systems are selected from any of: sensible thermal storage systems, hot water thermal storage schemes, chilled water systems, underground thermal energy storage, latent thermal storage systems which rely on a phase change such as external melt ice on coil systems, internal melt ice on coil systems, encapsulated ice systems, ice harvesters, ice-slurry systems, ice glycol systems, phase change material systems, thermochemical storage device, sorption storage device, or combinations of different storage systems.

13. A district heating and/or cooling system comprising:
a set of three or more main supply conduits for carrying a thermal energy transfer fluid, each conduit carrying the fluid at a different temperature,
a plurality of consumer appliances distributed along the length of the main supply conduits, each consumer appliance connected to a higher temperature side of a first one of at least two conduits having thermal transfer fluid at different temperatures and connected to a lower temperature side of a second one of the at least two conduits having thermal transfer fluid at different temperatures and being separate from the first one, wherein said consumer appliance is connected to the at least two conduits by branch conduits,
at least one of the plurality of consumer appliances being adapted for either:
receipt of the fluid from the first one of the conduits and for extraction of heat energy and to discharge the fluid into the second one, or
receipt of the fluid from the second one of the conduits for cooling and to discharge the fluid into the first one,
further comprising:
a plurality of heat generating and/or cooling plants, each of the at least two conduits being connected to at least one of the plants to either:
raise the temperature of the fluid in the lower temperature conduit of the at least two conduits to the temperature of the fluid in the higher temperature conduit of the at least two conduits, or
lower the temperature of the fluid in the higher temperature conduit of the at least two conduits to the lower temperature conduit of the at least two conduits,
wherein the district heating and/or cooling system is adapted so that the flow of fluid in any of the main supply conduits is able to flow in at least two directions in each of said main supply conduits to maintain each of the main supply conduits at the different temperature, wherein the flow of fluid in any of the main supply conduits is without dedicated return conduits, wherein the district heating and/or cooling system is configured in a way such that each conduit of the set of three or more conduits is at the same pressure for carrying a thermal energy transfer fluid so as not to circulate the fluid through the district heating and/or cooling system continuously.

14. The district heating and/or cooling system according to claim 13, wherein the district heating and/or cooling system is adapted so that the flow of fluid in any of the conduits is bi-directional so that each of the conduits is configured as a supply and return conduit.

* * * * *